July 22, 1952 H. V. HANSEN 2,604,027
TRACTOR-BORNE IMPLEMENT
Filed Aug. 24, 1945 4 Sheets-Sheet 1
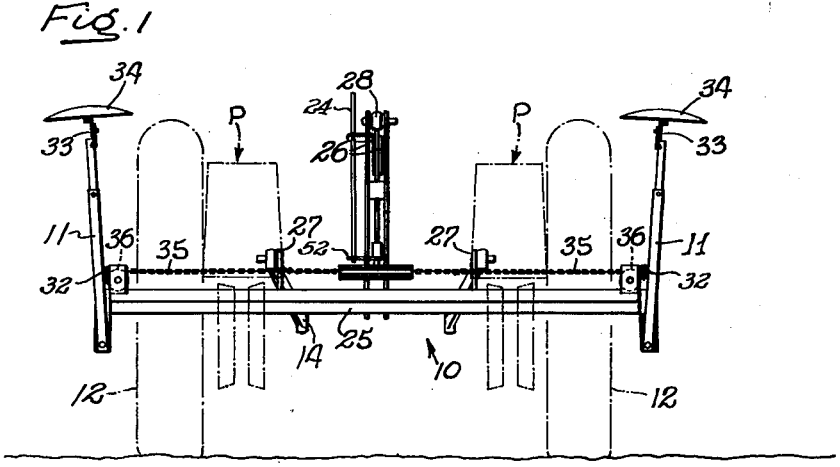
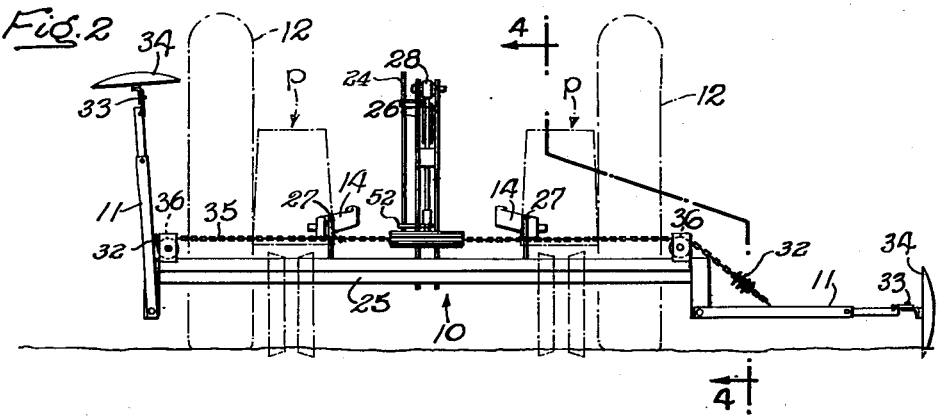
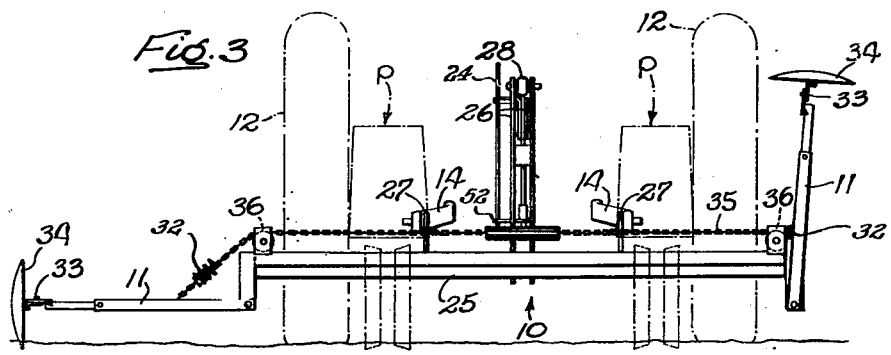
INVENTOR
Harold V. Hansen
By Carlson, Pitzner, Hubbard & Waye
ATTORNEYS

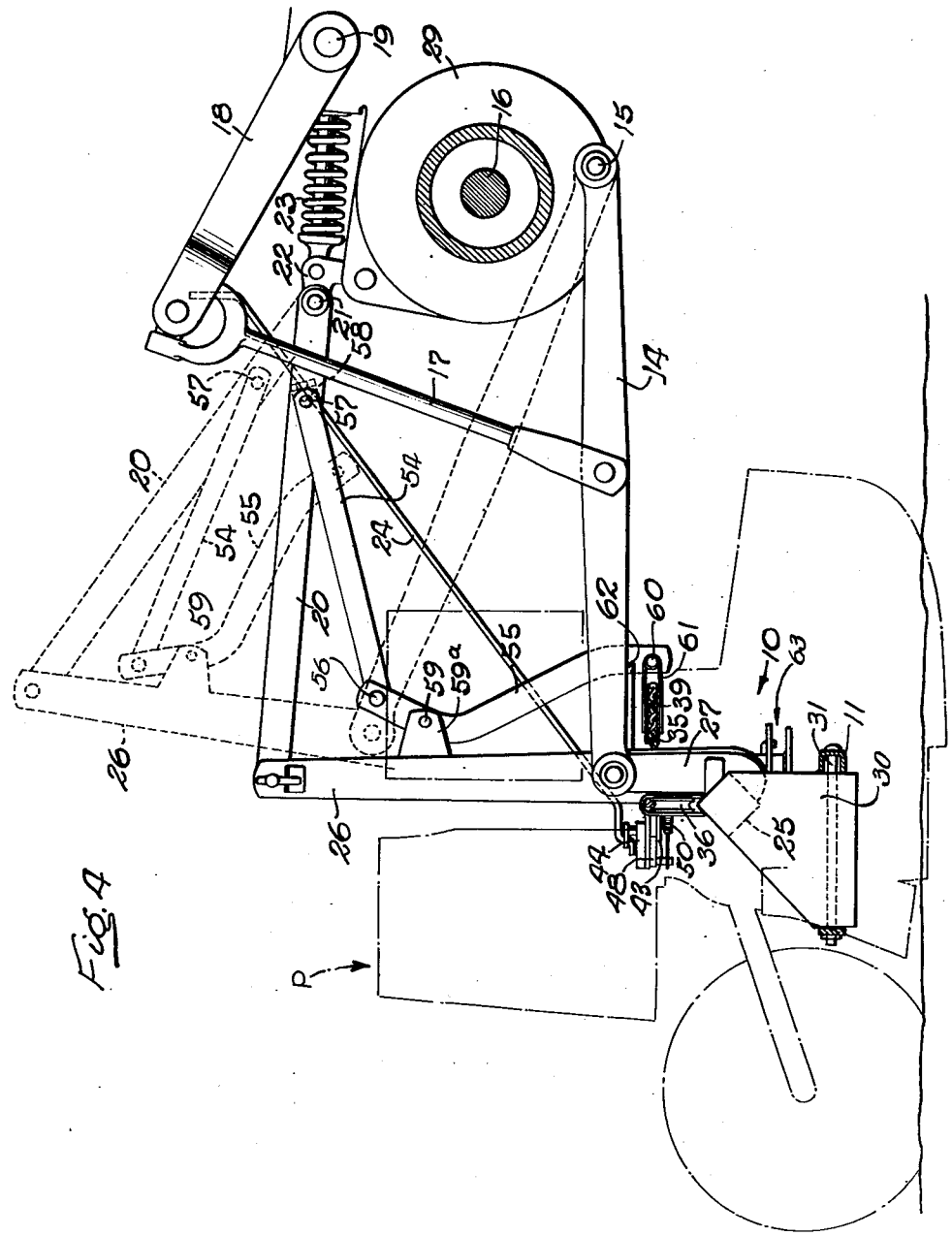

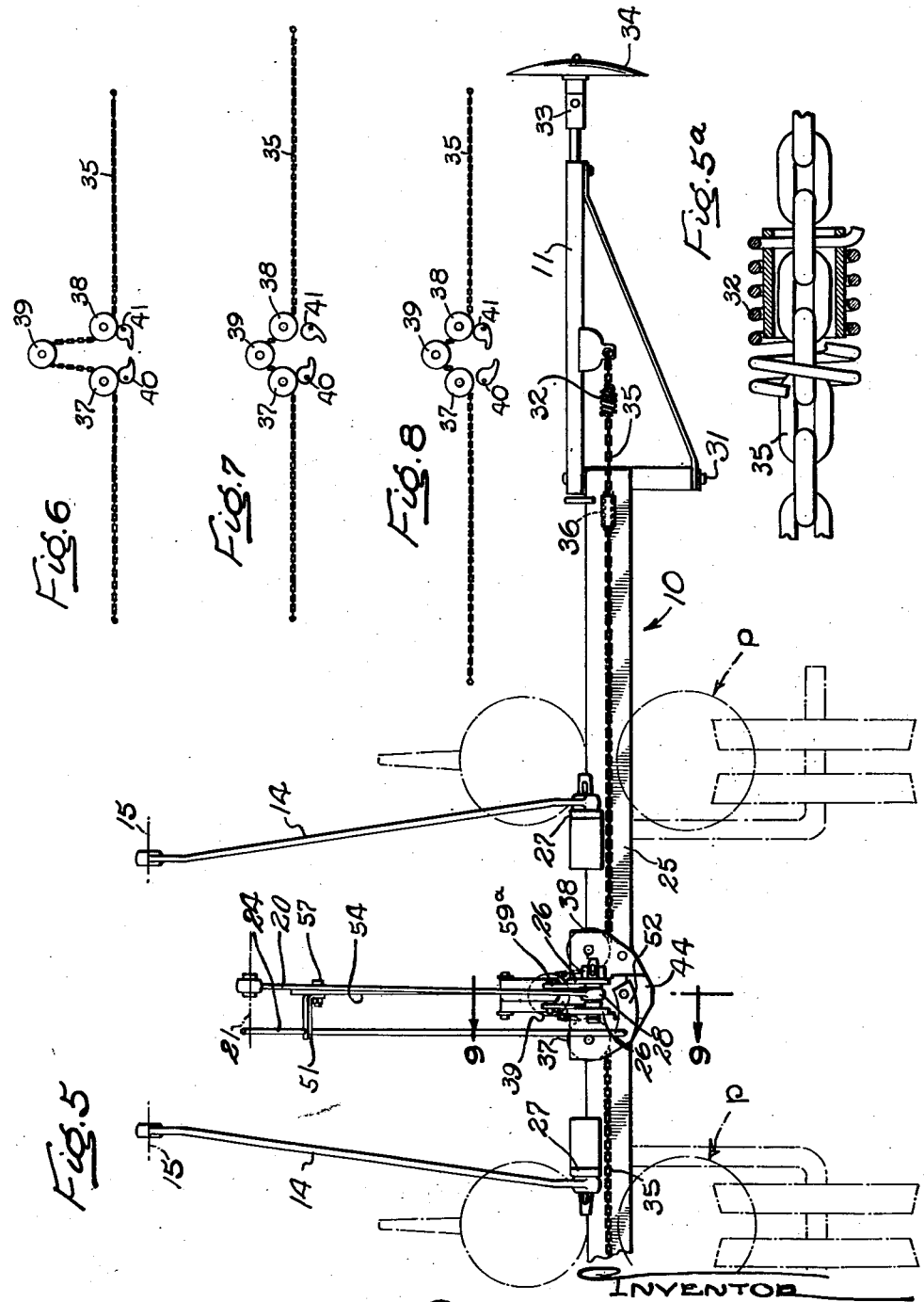

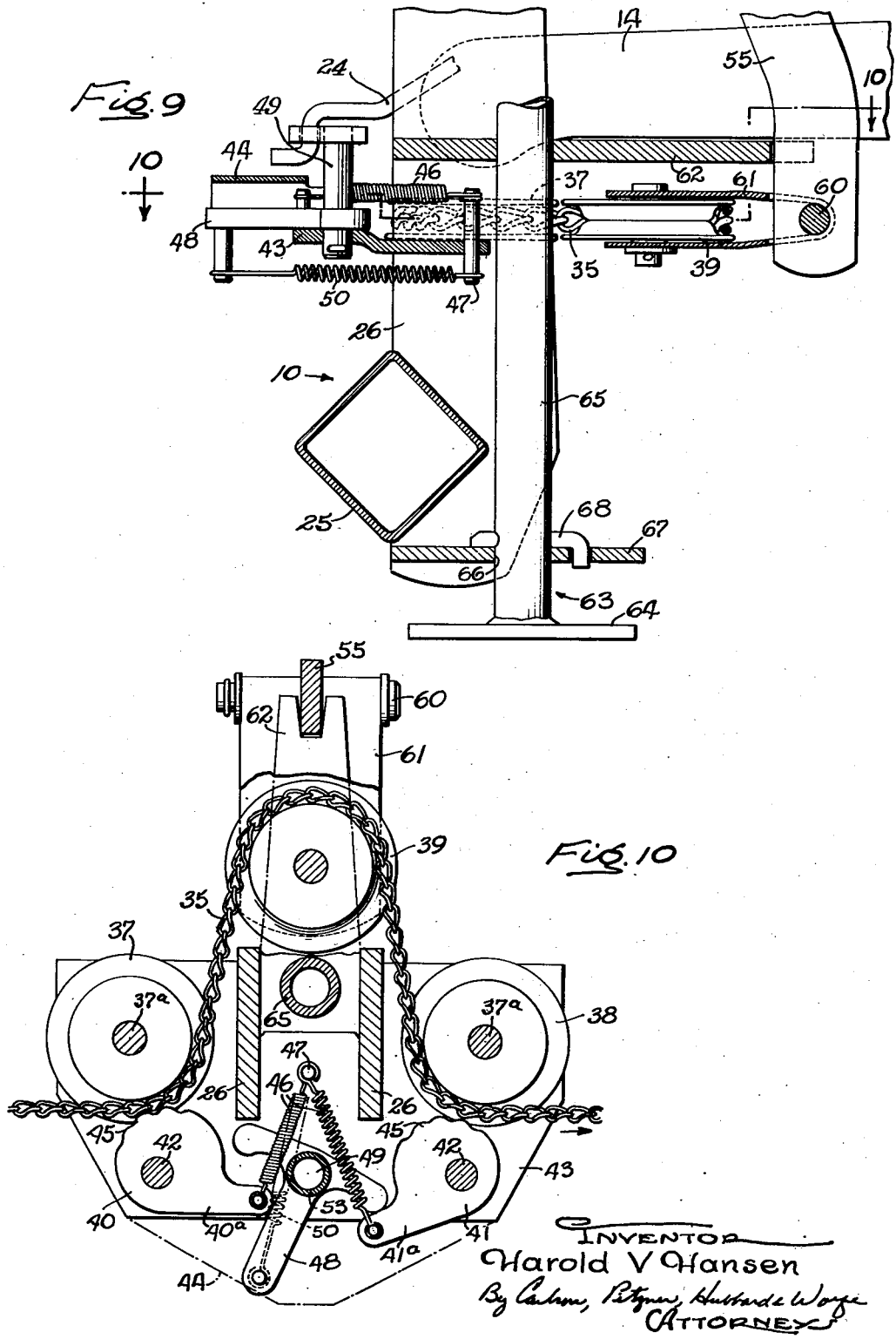

Patented July 22, 1952

2,604,027

UNITED STATES PATENT OFFICE 2,604,027

TRACTOR-BORNE IMPLEMENT

Harold V. Hansen, Dearborn, Mich., assignor to Harry Ferguson, Inc., Detroit, Mich., a corporation of Delaware Application August 24, 1945, Serial No. 612,457

13 Claims. (Cl. 97—230)

The present invention pertains to tractor-borne implements and, being particularly adapted for embodiment in row markers for planters, has been illustrated herein as so embodied. But it will be evident to those skilled in the art that in at least some of its broader aspects the invention is, however, applicable to implements intended for other uses.

One object of the present invention is to provide a novel and improved arrangement for effecting the lifting and lowering of individual ones of a pair of implement elements, such as a pair of marker arms, as an incident to bodily lifting and lowering of the implement main frame between transport and working positions by a power lift device on the tractor.

Another object is to provide an implement having individually movable ground-engaging elements, such, for example, as a pair of swinging arm type markers, carried on a frame which is adapted to be bodily lifted and lowered by a power lift device on the tractor, together with an arrangement such that whenever the frame is raised for transport both elements will also be automatically located in elevated position and by manipulation of a simple manually operated selector either element can be preliminarily conditioned for lowering with reference to the frame as an incident to the next succeeding lowering of the latter into working position which ensues.

Another object is to provide for use on a tractor having trailing upper and lower links with a power-operated lift device therefor, a supplemental actuating linkage adapted to coact with the tractor-borne links for positionally adjusting an implement as an incident to vertical movement of the implement by the tractor-borne links.

Still another object is to provide a row marker arrangement for planters in which two swinging arms are interconnected by a chain or other flexible line and a mechanism provided for effecting in a novel and simplified manner the selective individual lowering of said arms and subsequent elevation of the same.

Further objects and advantages of the invention will become apparent as the following description proceeds, taken in connection with the accompanying drawings in which:

Figure 1 is a rear end elevation of a row crop planter equipped with a pair of swingably mounted marker arms, such implement embodying the present invention. Both the planter units mounted on the main frame of the implement and the rear traction wheels of the tractor to which the implement is applied have been indicated in broken lines.

Figs. 2 and 3 are rear elevations similar to Fig. 1 but showing the implement in lowered working position rather than in elevated transport position and with respective alternate ones of the markers lowered into ground engagement.

Fig. 4 is an enlarged vertical sectional view taken substantially along the line 4—4 in Fig. 2, the rear end portion of the tractor also appearing in section.

Fig. 5 is a fragmentary plan view of the implement as it appears in Fig. 2, although on somewhat enlarged scale, together with the draft linkage on the tractor to which the implement is applied.

Fig. 5a is an enlarged detail sectional view of one of the springs associated with the marker arm pull chain of the implement.

Figs. 6, 7 and 8 are diagrammatic views of the pull chain interconnecting the swinging marker arms, together with the associated control devices for the chain, the positions for the parts in Figs. 6, 7 and 8 corresponding to the marker arm positions shown, respectively, in Figs. 1, 2 and 3.

Fig. 9 is an enlarged detail sectional view taken substantially along the line 9—9 in Fig. 5.

Fig. 10 is a detail sectional view taken substantially along the line 10—10 in Fig. 9 and showing particularly the chain control devices which appear diagrammatically in Figs. 6 to 8.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the exemplary embodiment of the invention herein illustrated in the drawings, I have shown in Fig. 1 a main frame, designated generally as 10, suitable for a row crop planter. This frame is detachably secured to a vertically swingable tractor-borne draft linkage which is powered from the tractor for lifting and lowering movement of the implement. It is with the attainment of automatic positional adjustment or shift of a preselected one of a plurality of implement elements, herein exemplified as a pair of swinging marker arms 11, as an incident to bodily raising and lowering of the implement main frame, that the present invention is principally concerned.

In the present instance the tractor itself has been illustrated only fragmentarily, the rear or traction wheels appearing in broken lines at 12, and has been indicated as equipped with a well-known form of power-operated draft linkage. For details of the linkage and hydraulic actuating unit therefore included in the tractor, reference may be made to Henry George Ferguson Patent No. 2,118,180, issued May 24, 1938. For the present suffice it to note that a pair of laterally spaced tension links 14 (Figs. 1, 4 and 5) are trailingly universally pivoted on the tractor at points 15 located beneath and slightly forward of the tractor's rear axle 16. These links are suspended by drop links 17 from corresponding crank arms 18 fixed to the opposite ends of a transverse rock shaft 19 which is arranged to be turned by a hydraulic ram (not shown). In general the arrangement is such that upon admission of hydraulic fluid to the ram the links 14 are raised to the dotted line position shown in Fig. 4, thus elevating the implement to transport position, whereas upon exhausting fluid from the ram the links 14 are lowered to the full line position shown in Fig. 4 to correspondingly lower the implement into working position.

Also trailing from the tractor is a top link 20 (Fig. 4) pivoted at 21 on a shackle 22. As disclosed in Ferguson Patent No. 2,118,180 referred to above, the thrust on the top link, resisted by a spring 23, may be utilized to control the hydraulic system automatically in regulating the draft load of a tillage implement or the like. In the present implement, however, the hydraulic system is used primarily simply for raising and lowering the implement between transport and working positions, so no further note of the potentially available automatic control need be taken here.

In general, the presently disclosed implement is so constructed that when raised to the transport position shown in Fig. 1, both of the marker arms 11 are automatically located in their raised or transport positions also there shown. By shifting a selector or control rod 24 the operator preliminarily conditions one or the other of the marker arms for automatic lowering into working position as an incident to subsequent bodily lowering of the implement as a whole into its lowered or working position. If desired both markers can be conditioned to remain upright as the frame is lowered by simply shifting the control rod 24 to an appropriate position.

Turning now to somewhat more of the detail of the illustrated implement, the main frame 10 is of inverted T-shape (Fig. 1). It includes a horizontal tubular beam 25 of diamond-shaped cross section (see Fig. 9 for cross section), as well as a pair of uprights 26 rigidly fixed to the central portion of the beam 25 in closely spaced relation to each other. Brackets 27 fixed to the beam 25 are pivotally connected at their upper ends to the trailing ends of the tractor-borne tension or draft links 14, thus suspending the implement from such links. The rear end of the top link 20 (see Fig. 4) is received between and pivotally connected to the uprights 26 by a disengageable universal ball joint 28 (Figs. 1 and 5).

On the frame beam 25 may be mounted suitable planter units P indicated in broken lines. Since various forms of such units are well known, and in any event form no part of the present invention, detailing appears to be unnecessary.

Upon reference to Fig. 4, it will be perceived that the frame 10 joins the upper and lower draft links 20, 14 to complete a jointed quadrilateral figure, of which the front side is constituted by the differential housing 29 of the tractor. It will be further noted that such quadrilateral figure is partially collapsed upon raising of the implement to transport position and is distended upon lowering to the working position shown in full lines. Such alternate collapse and distention of the quadrilateral linkage noted is utilized in actuating the marker arms 11 in a manner which will later appear.

To the outer ends of the frame beam 25 are pivoted the marker arms 11 to swing vertically about horizontal axes extending longitudinally of the path of tractor travel. For that purpose generally triangular gusset plates 30 are fixed at their apexes to opposite ends of the beam 25 and have rock shafts 31 mounted to extend along their lower portions and on which the marker arms 11 are pivoted. On the outer ends of the marker arms are brackets 33 on which are rotatably journaled marker disks 34.

Joining the marker arms 11 is a flexible line shown as a chain 35. This chain is short enough that only one marker arm at a time can be located in horizontal or lowered position. When one arm is so lowered the other must be in raised position. It is by appropriately tensioning this chain and by slacking off a portion of it while clamping another portion that the marker arms are manipulated. It will be noted that the chain is led over idler or guide sheaves 36 journaled at opposite ends of the beam 25 (Fig. 1) and thence over a second pair of guide sheaves 37, 38 (Figs. 6 and 10) journaled adjacent the beam to rotate about spaced vertical axes. The portion of the chain running between the last-mentioned pair of sheaves is trained over a central sheave 39 which is movable bodily toward and from the pair 37, 38.

To apply tension to the chain 35 and thus draw a bight in its central portion to place the marker arms 11 in their transport position shown in Fig. 1, the central sheave 39 is pulled forward to the position diagrammed in Fig. 6. The linkage arrangement for effecting such bodily shift of the sheave 39 will be described below. Alternately engageable locking dogs 40, 41 are provided for clamping the opposed portions of the chain against corresponding ones of the pair of sheaves 37, 38. Such dogs are moved alternately into and out of locking positions by the manual selector 24. When the left hand dog 40 is in locking position and the righthand dog released, as shown in Fig. 7, lowering of the righthand marker arm 11 to the position of Fig. 2 ensues upon a rearward movement of the central sheave 39 to slack off the bight in the chain 35. Similarly, when the righthand dog 41 is engaged and the lefthand dog released as in Fig. 8, lowering of the lefthand marker arm to the position of Fig. 3 takes place upon rearward movement of the central sheave 39 to slack off the chain. In each case the marker arm corresponding to the locked dog remains in elevated position. Should both dogs be in locking or clamping position, both arms remain elevated as the chain is slackened.

Detail of the chain locking mechanism including the locking dogs 40, 41 appears in Figs. 9 and 10. As there shown, the dogs are eccentrically journaled on pivot pins 42 rigid with and extending upwardly from a horizontal supporting plate 43, fixed to the frame uprights 26 a short distance above the horizontal frame beam 25. The coacting pair of sheaves 37, 38 are rotatably mounted on pivot pins 37a likewise rigid with plate 43 and disposed to locate the sheaves adjacent the peripheral surfaces of the corresponding dogs. The pivot pins 37a and 42 extend through a demountable cover plate 44 which is held in place by such means as cotter pins (not shown) through the upper ends of the pivot pins. The eccentric surfaces of the dogs have roughened or shallowly toothed surfaces 45 thereon arranged to be moved toward the associated sheaves 37, 38 as the dogs 40, 41 are respectively swung counterclockwise and clockwise. Contractile springs 46 anchored to a pin 47 extending between the plates 43, 44 and to respective ones of the dogs 40, 41 urge the latter yieldably toward locking position. A coacting T-shaped unlocking cam 48 serves to cam alternate ones of the dogs into released position, while freeing the remaining dog for movement into engaged position by its biasing spring. Thus the T-shaped cam is fixed to a pin 49 oscillatably mounted in the supporting plates 43, 44 and with the arms of the T disposed to engage corresponding projections 40a, 41a on the dogs 40, 41. An over-center spring 50 anchored to the outer end of the stem of the T-shaped cam 48 and to the stationary pin 47 serves to snap the cam from dead center position when the latter is moved by the manual selector rod 24.

As to the selector rod 24, it will be observed upon reference to Fig. 5 that it is slidably guided for endwise movement in a bracket 51 secured to the top link 20. The bracket 51 and the upper end of the rod 24 may, for example, be provided with appropriate notch and detent mechanism to define an extreme forward, an extreme rearward, and a central position for the selector rod 24. The lower end of the rod is pivotally connected to an arm 52 (Figs. 5 and 9) projecting laterally from the pin 49 to which the T-shaped cam 48 is fixed. The inner end of such arm is also fixed to this pivot pin 49. Consequently, when the operator shoves the rod 24 into its rearward position, the T-shaped cam 48 is rocked counter-clockwise (as viewed in Fig. 10), unlocking the lefthand dog 40. When the operator pulls the rod 24 into its forward position, the T-shaped cam is rocked in the opposite or clockwise direction to the position shown in Fig. 10, moving the other dog 40 to its released position, while the dog 41 snaps into locking position. When the selector rod is in its central position, it holds the cam 48 centered, thereby leaving both dogs in locking position. In other words, when the T-shaped cam 48 is in central position both of the projections 40a, 41a are freed by it so that the contractile springs 46 pull both of the dogs 40, 41 into locking position. By thus locking both dogs, both of the marker arms may be locked in elevated transport position.

Attention may next be given to the arrangement for moving the central sheaves 39 into and out of chain tensioning position. As heretofore mentioned, the bodily movement of the sheave 39 for tensioning and slacking off the chain 35 is accomplished as an incident to raising and lowering of the tractor-borne draft linkage 14, 20. An auxiliary linkage (Fig. 4) is arranged to be actuated by the main linkage for that purpose. In the present instance, such auxiliary linkage includes an upper link 54 extending along beneath the main top link 20 and a generally upright link 55 extending along the forward side of the frame uprights 26. These two links 54 and 55 are pivoted together at 56. Moreover, the forward end of the upper link 54 is pivoted to the top link 20 by a pin 57 inserted in a hole 58 in the top link, whereas the other auxiliary link 55 is pivoted at 59 intermediate its ends on a bracket 59a extending forwardly from the frame uprights 26 and fixed thereto. The lower portion of the auxiliary link 55 is curved forwardly and pivoted at its lower end to a transverse pivot pin 60 carried on a supporting yoke 61 in which the sheave 39 is journaled.

As the main draft linkage 14, 20 is swung upward in lifting the implement to transport position, the quadrilateral figure in which the draft links are comprised, as heretofore outlined, collapses into the dotted line position shown in Fig. 4. Coincidentally with the approach of the frame uprights 26 toward the top link 20 which takes place during this collapsing movement, the auxiliary links 54, 55 are also collapsed or scissored toward each other. The resultant thrust of the upper auxiliary link 54 on the vertical auxiliary link 55 rocks the latter about its pivot 59. It will be perceived that since the upper link 54 connects the upright link 55 to the tractor (through the top link 20) at a point eccentric to pivots (15) for the lower draft links 14 that the link 55 will be rocked fore and aft as an incident to raising and lowering of the links 14. To analyze the linkage motion in a somewhat different manner, it will be observed that the top draft link 20 and frame uprights 26 constitute the arms of a first scissors and the auxiliary links 54, 55 constitute the arms of a second scissors and which roughly parallels the first. If the pivot between 20 and 26 were coincident with the pivot between 54 and 55 then there would be no relative movement between 20 and 54 nor between 26 and 55. But since these pivots are offset there is relative motion of the parts noted and moreover, the arrangement is such that the scissoring between top link 20 and frame uprights 26 is exaggerated in the angular motion of the auxiliary links with reference to each other. Moreover it is to be noted that the farther the free end of the link 55 is extended from the pivot 59, the greater will be the length of movement of such free end with reference to the frame for any given change in angle of the links 54, 55 relative to each other.

As lower end of the link 55 is swung forward it draws the sheave 39 forward with it. Similarly, as the implement is lowered by the draft linkage back into working position, the auxiliary links are swung back to the full line position shown in Fig. 4. The weight of the freed one of the marker arms 11 keeps the unlocked portion of the chain 35 taut at all times as the central sheave 39 moves rearwardly. When the marker arms are fully upright they are nearly balanced. To afford an initial impulse of force for lowering the arms, springs 32 loosely surround the end portions of the chain between the guide sheaves 36 and the marker arms. These springs will be compressed by the marker arms against the supports for the guide sheaves 36 when the arms are upright. Upon freeing of the portion of chain leading to one of the arms, the corresponding springs 32 is released to thrust the adjacent arm outward and thus initiate its descent. Thereafter the weight of the arm holds the chain taut.

A stop plate 62 is fixed to the uprights 26 and projects forwardly from them to intercept the link 55 as it swings rearward and thus limit such swing, the stop plate having a notch in its forward end to receive the link. Abutment of the link 55 against the stop 62 limits the distending or lowering movement of the draft linkage as a whole. The point of connection of the upper auxiliary link 54 with the top draft link 20 is such that the elevation of the draft linkage (and hence of the implement) from the ground, when in lowered position, is at a desired level for proper ground engagement by the markers. The auxiliary linkage 54, 55 thus serves as a limiting means in addition to its action in the operation of the marker arms 11.

To support the implement when it is detached from the tractor, or while it is being detached, a stand 63 (Fig. 9) is provided. Such stand includes a base plate 64 fixed to an upright stem or shank 65 slidably received in an aperture 66 in a bracket 67 fixed to the uprights 26. Normally the stand is held elevated in the position of Fig. 9 by a pin 68 passed through the stem 65. The right angle end of pin 68 falls in a hole in plate 67 to lock pin 68 in place. To lower the stand, it is first raised slightly until the right angle end of the pin 68 clears the hole in plate 67 and then the pin is withdrawn, the stand dropped down, and the pin passed through a second hole (not shown) higher up in the stem and with the pin beneath the bracket 67.

The operation of the disclosed implement will in general be clear from the foregoing. By way of brief recapitulation, let it be assumed first of all that the tractor is proceeding with the implement in the raised or transport position shown in Fig. 1. To start the planting the operator actuates the hydraulic mechanism on the tractor to lower the draft linkage 14, 20 whereupon the implement is lowered into the working position shown in Figs. 2 and 3. As a preliminary to such lowering of the implement, the operator determines which of the row marker arms 11 he wishes to have in operation and shifts the selector rod 24 to free the corresponding one of the pair of clamping dogs 40, 41. Thus either the right or lefthand one of the marker arms 11, whichever is selected, will swing downward into working position as the implement is lowered.

As the planting progresses the lowered one of the marker disks 34 rolls along the ground in the usual manner, leaving a mark in the field which serves as a guide for the tractor driver in planting the next row. As each row is planted a mark is made with the appropriate one of the markers for accurate guiding during the planting of a succeeding row. Planting in precisely spaced rows is thus made feasible. The operator has, at all times, full manual control of the marker arms. Upon approaching an obstruction he can raise the implement, causing the lowered marker arm to rise. Upon again lowering the implement, that same marker arm will drop again into working position if he has not shifted the control rod 24. Should he wish to alternate the marker arm positions he raises the implement by the hydraulic actuator, and shifts the rod 24 to lock the arm which was previously lowered and free the other. Then the implement is lowered again.

To detach the implement from the tractor the stand 63 (Fig. 9) is lowered and the draft linkage 14, 20 also lowered. Preliminary to such lowering, both of the dogs 40, 41 may be locked by centering the releasing cam 48 so that both marker arms 11 will be retained in elevated position as the implement is lowered. With the implement resting on its supporting stand 63 and planter unit ground wheels it is but the work of a moment to disengage the pivotal connections of the brackets 27 with the lower links 14 and the pivotal connection 21 of the upper link with the shackle 22. Having disengaged these three connections the tractor can be driven away and another implement attached if desired. Reattachment of the present implement is obviously equally simple.

I claim as my invention:

1. In an implement for a tractor having a power lift device thereon, the combination of an implement frame having means thereon for suspending said frame from said lift device for bodily lifting and lowering movement between alternate transport and working positions, a pair of marker arms pivoted on said frame at opposite sides of the latter to swing individually between lowered laterally projecting positions and upright positions therefor, a flexible line fixed at its opposite ends to said arms, means operable automatically as an incident to raising said frame into transport position by the power lift device for drawing a bight in the central portion of said line to raise both of said arms to upright position and for slacking off said bight as an incident to lowering of said frame, and means for clamping said line at points intermediate said bight and individual ones of said arms to retain the corresponding arms elevated upon slacking off of said bight by lowering of said frame.

2. In an implement for a tractor having a power lift device thereon, the combination of an implement frame having means thereon for suspending said frame from said lift device for bodily lifting and lowering movement between alternate transport and working positions, a pair of marker arms pivoted on said frame at opposite sides of the latter to swing individually between lowered laterally projecting positions and upright positions therefor, a flexible line fixed at its opposite ends to said arms, means operable automatically as an incident to raising of said frame into transport position by the power lift device for drawing a bight in the central portion of said line to raise both of said arms to upright position and for slacking off said bight as an incident to lowering of said frame, a pair of clamping means for gripping said line at points between said bight and respective ones of said marker arms, and manually operable selector means for shifting alternate ones of said clamping means into gripping engagement with said line preparatory to lowering of said frame by the power lift device.

3. In an implement for a tractor having a power lift device thereon, the combination of an implement frame having means thereon for suspending said frame from said lift device for bodily lifting and lowering movement between alternate transport and working positions, a pair of marker arms pivoted on said frame at opposite sides of the latter to swing vertically between lowered laterally projecting positions and upright positions therefor, a flexible line fixed at its opposite ends to said arms, a pair of laterally spaced guides on said frame over which said line is led, means operable automatically as an incident to raising said frame into transport position by the power lift device for drawing a bight in the portion of said line between said guides to raise both of said arms to upright position and for slacking off said bight as an incident to lowering of said frame, and manually operable means for clamping said line against either or both of said guides.

4. In an implement for a tractor having a link trailingly pivoted thereon generally horizontally for vertical swing and also a power lift device for raising an implement, the combination of an implement frame, means pivotally connecting said frame to said link in generally upright position for scissoring of the two toward and from each other as an incident to rise and fall of the link and frame, a pair of auxiliary links extending respectively along the first-mentioned link and said frame, means pivotally connecting respective ones of said auxiliary links to the first-mentioned link and to said frame, means pivotally connecting said auxiliary links together but at a point offset with respect to the pivotal connection between said frame and the first-mentioned link for effecting scissoring of said auxiliary links in unison with like motion of said frame and said first-mentioned link but through an exaggerated angle as compared to the angle of relative movement between said frame and said first-mentioned link, an element positionally adjustable with reference to said frame, and means for shifting said element in response to movement of the one of said auxiliary links pivoted on said frame.

5. In an implement for a tractor assembly including a tractor having a vertically swingable draft link trailingly pivoted thereon as well as a power lift device for effecting vertical movement of such link, the combination of an implement frame having means thereon for detachably connecting the same to the draft link for vertical movement of the frame by such link, a pair of marker arms pivoted on said frame at opposite sides of the latter to swing vertically between lowered laterally projecting positions and upright positions therefor, a flexible line fixed at its opposite ends to said arms, means including an auxiliary link pivoted on said frame to rock generally fore and aft of the latter for drawing a bight in the central portion of said line, and means for connecting said auxiliary link to the tractor assembly at a point eccentric with respect to the axis of vertical swing of the draft link for rocking said auxiliary link as an incident to raising and lowering of the frame by the draft link.

6. In an implement for a tractor having upper and lower vertically swingable links trailingly pivoted thereon as well as a power lift device for effecting vertical movement of at least one of such links, the combination of an implement frame having means thereon for pivotally connecting the same at respective vertically spaced points to both the upper and lower links, a pair of marker arms pivoted on said frame at opposite sides of the latter to swing individually between lowered laterally projecting positions and upright positions therefor, a generally upright first auxiliary link pivoted intermediate its ends on said frame to rock generally fore and aft of the latter about a horizontal axis, a second auxiliary link pivotally connected to the upper end of the first auxiliary link and adapted to extend forwardly beneath the aforesaid upper link, means pivotally connecting the forward end of said second auxiliary link to the aforesaid upper link for causing said second auxiliary link to rock the upper end of said first auxiliary link rearward upon raising of the aforesaid upper and lower links, and selectively operable means for shifting individual ones of said marker arms in response to rocking of said first auxiliary link.

7. In an implement for a tractor having upper and lower vertically swingable links trailingly pivoted thereon as well as a power lift device for effecting vertical movement of at least one of such links, the combination of an implement frame having means thereon for pivotally connecting the same at respective vertically spaced points to both the upper and lower links, a generally upright first auxiliary link pivoted intermediate its ends on said frame to rock generally fore and aft of the latter about a horizontal axis, a second auxiliary link pivotally connected to the upper end of the first auxiliary link and adapted to extend forwardly beneath the aforesaid upper link, means pivotally connecting the forward end of said second auxiliary link to the aforesaid upper link for causing said second auxiliary link to rock the upper end of said first auxiliary link rearward upon raising of the aforesaid upper and lower links, an element positionally adjustable with reference to said frame, and means for shifting said element in response to rocking of said first auxiliary link.

8. In an implement for a tractor having a link trailingly pivoted thereon for vertical movement and also a power lift device, the combination of an implement frame, means pivotally connecting said frame to the link for scissoring of the two toward and from each other as an incident to rise and fall of the link and frame, an auxiliary linkage including a pair of links pivoted together to swing toward and from each other, means pivotally connecting respective ones of said auxiliary links to the first-mentioned link and to said frame for effecting scissoring of said auxiliary links toward and from each other in unison with like movement of said frame and said first-mentioned link, the point of pivotal connection of said auxiliary links to each other being offset with respect to the point of pivotal connection of frame and said first-mentioned link, wherefore each of said auxiliary links moves relative to its associated one of the latter elements in course of the scissoring, and stop means for positively limiting the movement of the auxiliary link pivoted on said frame toward the latter to correspondingly limit the lowering movement of said frame.

9. In an implement for a tractor having a power actuated lift device thereon, the combination of an implement frame having means thereon for suspending said frame from the lift device for bodily lifting and lowering movement between alternate transport and working positions, a pair of ground-engaging elements mounted on said frame for individual movement between raised and lowered positions with reference to said frame, and means operable automatically as an incident to each raising of said frame to transport position for effecting the positioning of both of said elements in elevated position with reference to said frame and operable as an incident to lowering of said frame for coincidentally lowering a selected one of said elements with reference to said frame while retaining the other element in its elevated position with reference to said frame, said last-mentioned means including a pair of rigid auxiliary links pivotally connected to each other, one of said links being pivoted on said frame and the other of said links being pivotally interconnected with the tractor.

10. In an implement for a tractor having a power actuated lift device thereon, the combination of an implement frame having means thereon for suspending said frame from the lift device for bodily lifting and lowering movement between alternate transport and working positions, a pair of ground-engaging elements mounted on said frame for individual movement between raised and lowered positions with reference to said frame, means including a manually operable selector device carried by said frame for locking a selected one of said elements in raised position while leaving the other free to move between a fully raised and a fully lowered position relative to said frame, and means operable automatically as an incident to each raising of said frame to transport position for effecting an elevation of the free one of said elements and also operable as an incident to lowering of said frame for lowering the free one of said elements with reference to said frame.

11. In an implement for a tractor having a power actuated lift device thereon, the combination of an implement frame having means thereon for suspending said frame from the lift device for bodily lifting and lowering movement between alternate transport and working positions, a pair of ground-engaging elements mounted on said frame for individual movement between raised and lowered positions with reference to said frame, means including a manually actuatable selector device carried by said frame having an operative position wherein both of said elements are locked in raised position, said selector device also having additional operative positions wherein respective ones of said elements alone may be locked in raised position while leaving the other free to move up and down, and means operable automatically as an incident to each raising of said frame to transport position for effecting an elevation of the free one, if any, of said elements and also operable as an incident to lowering of said frame for lowering the free one, if any, of said elements with reference to said frame.

12. In an implement for a tractor having a power actuated lift device thereon, the combination of an implement frame having means thereon for suspending said frame from the lift device for bodily lifting and lowering movement between alternate transport and working positions, a pair of ground-engaging elements mounted on said frame for individual movement between raised and lowered positions with reference to said frame, means including a manually actuatable selector device carried by said frame for locking a selected one of said elements in raised position with respect to said frame while leaving the other free to move up and down throughout successive raising and lowering of said frame and until said selector device is manually shifted to a different position, and means operable automatically as an incident to each raising of said frame to transport position for effecting an elevation of the free one of said elements and also operable as an incident to lowering of said frame for lowering the free one of said elements with reference to said frame.

13. In an implement for a tractor having vertically swingable upper and lower draft links trailingly pivoted on its rear end portion as well as auxiliary power lift means connected with at least one of said links, the combination of an implement frame having a generally upright portion with means thereon for pivotally connecting the same at vertically spaced points to the trailing ends of respective ones of the draft links, a pair of ground-engaging elements mounted on said frame for individual movement between raised and lowered positions with reference to said frame, and means operable automatically in response to movement of said upright frame portion relative to the draft links in the course of vertical movement of the latter in raising said frame to transport position for effecting the positioning of both of said elements in an elevated position with reference to said frame, and also operable as an incident to lowering of said frame by the draft links for coincidentally lowering a selected one of said elements with reference to said frame while retaining the other element in its elevated position with reference to said frame, said means including a pair of scissor links one of which is pivoted to said frame and the other of which is pivoted to the upper link of said tractor.

HAROLD V. HANSEN.

REFERENCES CITED

The following references are of record in the file of this patent:

UNITED STATES PATENTS

| Number | Name | Date |
| --- | --- | --- |
| 1,078,846 | Gosnay | Nov. 18, 1913 |
| 1,888,502 | Holstein | Nov. 22, 1932 |
| 1,911,218 | White | May 30, 1933 |
| 1,972,703 | Collins | Sept. 4, 1934 |
| 2,178,124 | Robinson | Oct. 31, 1939 |
| 2,296,210 | Kriegbaum et al. | Sept. 15, 1942 |
| 2,312,258 | Martin | Feb. 23, 1943 |
| 2,321,464 | Cook | June 8, 1943 |
| 2,337,801 | Cook | Dec. 28, 1943 |
| 2,352,466 | Arps | June 27, 1944 |
| 2,358,964 | Noffsinger | Sept. 26, 1944 |
| 2,376,464 | White | May 22, 1945 |
| 2,401,837 | Mellen et al. | June 11, 1946 |
| 2,457,163 | Lansing | Dec. 28, 1948 |

FOREIGN PATENTS

| Number | Country | Date |
| --- | --- | --- |
| 473,798 | France | Oct. 15, 1914 |
| 544,041 | Great Britain | Mar. 25, 1942 |